United States Patent
Mocaer et al.

(10) Patent No.: US 12,115,696 B2
(45) Date of Patent: Oct. 15, 2024

(54) METHOD FOR INJECTING CERAMIC POWDERS WITH FILTER CREATED IN SITU IN THE FIBROUS PREFORM

(71) Applicant: SAFRAN CERAMICS, Le Haillan (FR)

(72) Inventors: Didier Yves Georges Mocaer, Moissy-Cramayel (FR); Emilie Lesizza, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/567,664

(22) PCT Filed: Jun. 6, 2022

(86) PCT No.: PCT/FR2022/051072
§ 371 (c)(1),
(2) Date: Dec. 6, 2023

(87) PCT Pub. No.: WO2022/263741
PCT Pub. Date: Dec. 22, 2022

(65) Prior Publication Data
US 2024/0262003 A1 Aug. 8, 2024

(30) Foreign Application Priority Data
Jun. 15, 2021 (FR) ..................... 2106297

(51) Int. Cl.
*B28B 1/24* (2006.01)
*B28B 1/00* (2006.01)
*B28B 7/00* (2006.01)
*B28B 23/22* (2006.01)

(52) U.S. Cl.
CPC ............... *B28B 1/24* (2013.01); *B28B 1/008* (2013.01); *B28B 7/0029* (2013.01); *B28B 23/22* (2013.01)

(58) Field of Classification Search
CPC ......... B28B 1/24; B28B 1/008; B28B 7/0029; B28B 23/22
USPC ....................................... 427/376.1
See application file for complete search history.

(56) References Cited

U.S. PATENT DOCUMENTS

| 2011/0111211 | A1 | 5/2011 | Golecki |
| 2017/0369382 | A1* | 12/2017 | Billotte Cabre .. C04B 35/62886 |
| 2020/0339480 | A1* | 10/2020 | Philippe ................ C04B 35/447 |

FOREIGN PATENT DOCUMENTS

| WO | WO 2016/102839 A1 | 6/2016 |
| WO | WO 2019/058069 A1 | 3/2019 |
| WO | WO 2019/129983 A1 | 7/2019 |

OTHER PUBLICATIONS

International Search Report as issued in International Patent Application No. PCT/FR2022/051072, dated Sep. 16, 2022.
Written Opinion of the International Searching Authority as issued in International Patent Application No. PCT/FR2022/051072, dated Sep. 16, 2022.

* cited by examiner

*Primary Examiner* — Hannah J Pak
(74) *Attorney, Agent, or Firm* — Pillsbury Winthrop Shaw Pittman LLP

(57) ABSTRACT

A method for injecting ceramic particles into a fibrous texture includes placing a fibrous texture in a mould, injecting from one side a first suspension including a powder of large filtration particles to form a filtration layer, injecting from the opposite side a second suspension into the fibrous texture, the second suspension including a powder of small refractory ceramic particles, then draining through the filtration layer the liquid phase of the second suspension having passed through the fibrous texture and retaining the refractory ceramic particle powder inside the fibrous texture by the filtration layer of so as to obtain a fibrous preform including at least the fibrous texture filled with refractory ceramic particles and the filtration layer.

9 Claims, 2 Drawing Sheets

[Fig.1]
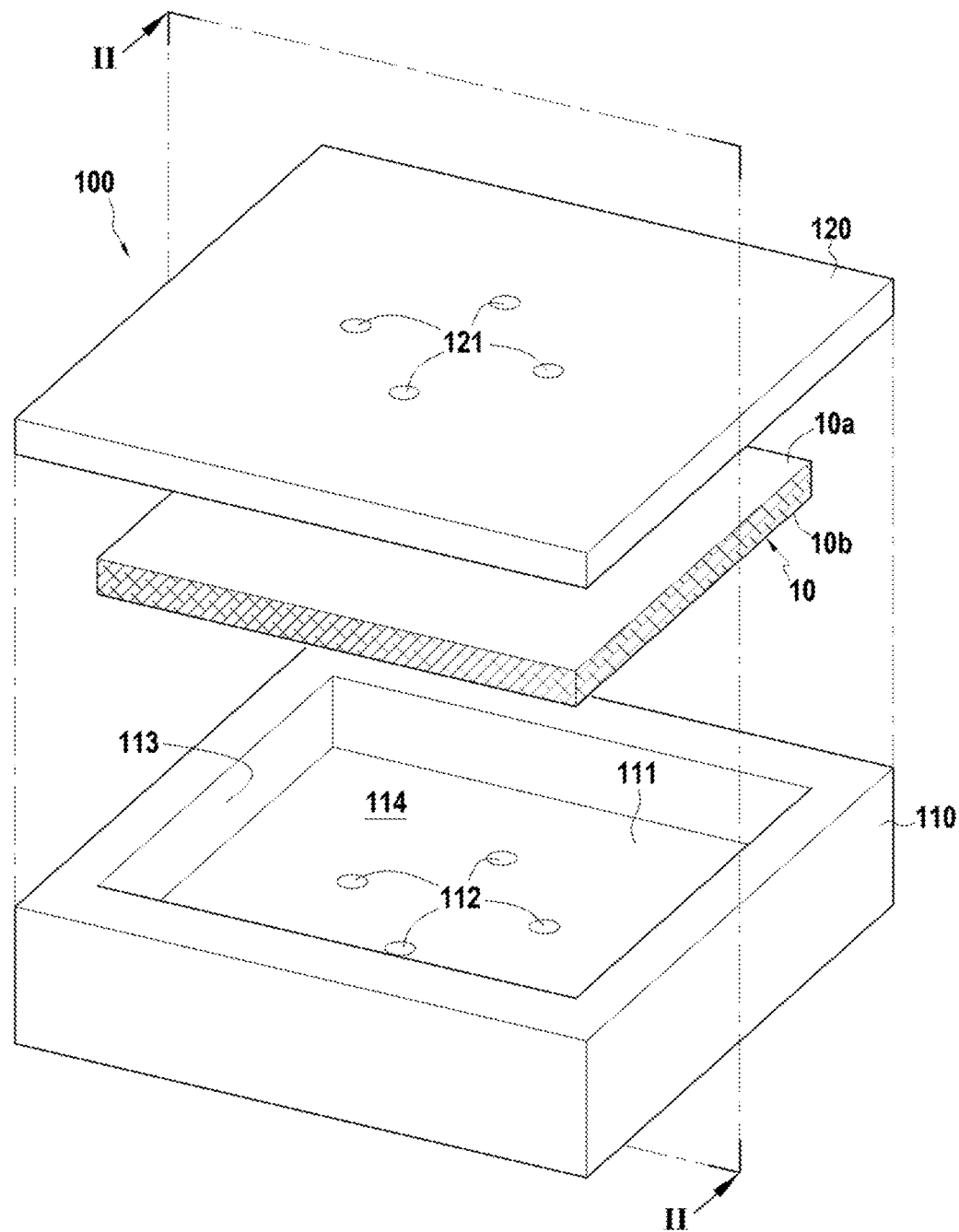

[Fig.2]
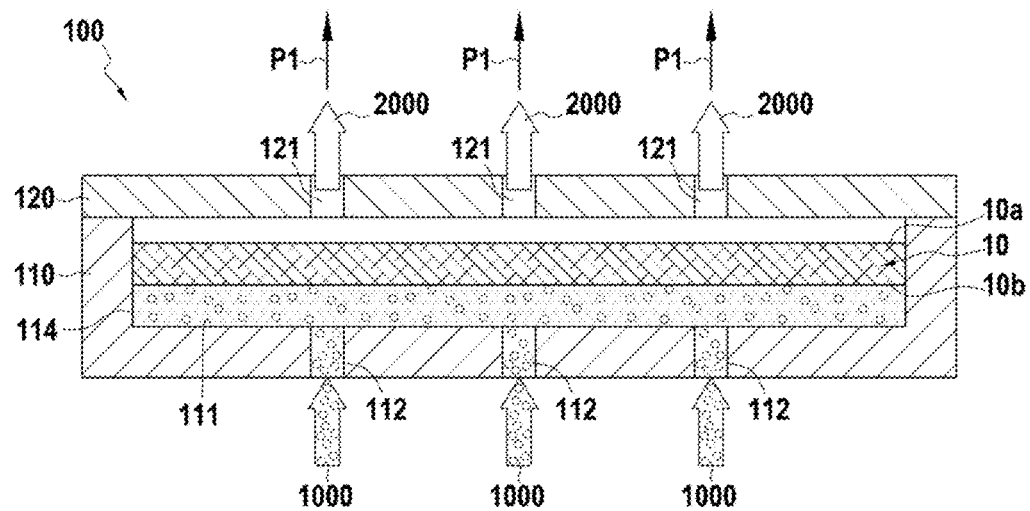
[Fig.3]
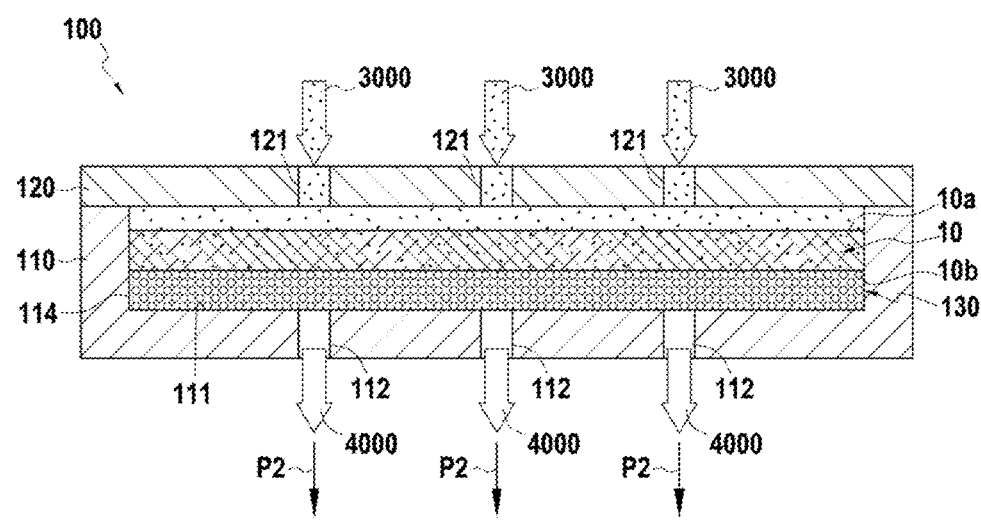

METHOD FOR INJECTING CERAMIC POWDERS WITH FILTER CREATED IN SITU IN THE FIBROUS PREFORM

CROSS-REFERENCE TO RELATED APPLICATIONS

This application is the U.S. National Stage of PCT/FR2022/051072, filed Jun. 6, 2022, which in turn claims priority to French patent application number 21 06297 filed Jun. 15, 2021. The content of these applications are incorporated herein by reference in their entireties.

TECHNICAL FIELD

The present invention concerns a method for injecting ceramic particles into a fibrous texture for the manufacture of a part made of Oxide/Oxide or ceramic matrix composite (CMC) material, i.e., comprising a fibrous reinforcement formed from fibres of refractory ceramic material densified by a matrix also of refractory ceramic material.

PRIOR ART

The manufacture of parts made of composite material with a ceramic matrix of the Oxide/Oxide or SiC/SiC type by injection generally comprises a step of impregnating a fibrous texture with a filled suspension, for example of alumina particles in the case of an Oxide/Oxide CMC or silicon carbide (SiC) particles in the case of a SiC/SiC CMC. The impregnation step is carried out by injection under pressure of a filled suspension within the fibrous texture (slurry transfer moulding (STM) process). In such a case, it is necessary to drain or filter the liquid phase of the suspension in order to obtain optimal filling of the residual porosities present in the fibrous texture with the solid fillers. Such a method is especially described in document WO 2016/102839. The use of a filter element interposed between the fibrous texture and the part of the mould on which the solvent from the suspension is evacuated is, therefore, necessary. The filtration element may consist of a rigid piece of porous material which must be detached from the fibrous texture during demoulding thereof after injection of the filled suspension and filtration of the solvent.

The use of such a filter element can pose difficulties. Indeed, removing it from the fibrous texture can prove difficult and lead to degradation of the injected fibrous texture. Moreover, since such a filter element is rigid, it is difficult to adapt to complex part geometries. To resolve these problems, it may be necessary to replace the rigid porous material part with a filtration layer, comprising a partially densified fibrous structure, which will be an integral part of the final composite material part. Such a filtration layer is especially described in document WO 2019/129983.

However, there are still disadvantages to using a filtration layer. Indeed, the filtration layer comprises a fibrous structure, which must be partially densified in order to form in the layer a network of porosity of a precise determined size, so as to allow the suspension solvent to pass while retaining the refractory ceramic particles. Thus, the filtration layer must be manufactured and treated before it can be deposited in the mould, adding additional steps to the injection process.

DISCLOSURE OF THE INVENTION

The present invention aims to remedy the aforementioned disadvantages and to propose a solution which makes it possible to facilitate the production by injection of parts made of composite material with a ceramic matrix (CMC), oxide, carbide or carbon base, by injection of a suspension loaded into a fibrous texture.

To this end, the invention proposes a method for injecting ceramic particles into a fibrous texture comprising the following steps:

placing a fibrous texture in a mould, the fibrous texture being interposed between one or more first ports and one or more second ports, injecting through the first port(s) a first suspension comprising a powder of filtration particles having a particle size greater than the size of the interstices of the pore network of the fibrous texture;

draining the liquid phase of the first suspension by the fibrous texture, evacuating said liquid phase through the second port(s) and retaining the filtration particles by the fibrous texture so as to form a filtration layer between said fibrous texture and the first port(s), injecting a second suspension into the fibrous texture through the second port(s), the second suspension comprising a powder of refractory ceramic particles with a particle size smaller than the size of the interstices of the pore network of the fibrous texture, draining through the filtration layer the liquid phase of the second suspension having passed through the fibrous texture and retaining the refractory ceramic particle powder inside said fibrous texture by the filtration layer so as to obtain a fibrous preform comprising at least the fibrous texture filled with refractory ceramic particles and the filtration layer, the liquid phase of the second suspension being evacuated through the first port(s).

Thus, thanks to the production of a filtration layer forming an integral part of the final composite material part, the problem of removing a filtration element is overcome and the surface condition of the filter side of the part is greatly improved. In addition, the manufacture of the filter is simplified compared to the filtration layers used in the prior art, since the filter interface is formed inside the mould itself. This avoids the preliminary steps necessary for the manufacture of a partially densified fibrous texture and the difficulties inherent in producing a porosity network of a precise size. The operations of setting up the filtration layer are also eliminated.

According to a particular characteristic of the method of the invention, the powder of the first suspension is a ceramic or glass precursor.

According to another particular characteristic of the method of the invention, the filtration layer has an average thickness comprised between 100 μm and 200 μm.

According to another particular characteristic of the method of the invention, the size of the particles of the second suspension is, on average, 5 to 15 times smaller than the average size of the interstices of the pore network of the fibrous texture.

According to another particular characteristic of the method of the invention, the particles of the second suspension are made of a material chosen from: alumina, mullite, silica, an aluminosilicate, an aluminophosphate, zirconia, a carbide, a boride, a silicide and a nitride or a mixture of several of these materials.

According to another particular characteristic of the method of the invention, in which the fibrous texture comprises a fibrous structure obtained by two-dimensional weaving, or three-dimensional or multilayer weaving, or automatic placement of unidirectional fibres.

According to another particular characteristic of the method of the invention, the threads of the fibrous texture are formed of fibres consisting of one or more of the following materials: alumina, mullite, silica, an aluminosilicate, a borosilicate, carbide silicon and carbon.

According to another particular characteristic of the method of the invention, the mould has an annular or frustoconical geometry of revolution, the fibrous texture being shaped according to an annular or frustoconical geometry of revolution when placed in the mould.

BRIEF DESCRIPTION OF THE DRAWINGS

FIG. 1 is a schematic exploded perspective view of a tool in accordance with one embodiment of the invention;

FIG. 2 is a schematic sectional view showing the tool of FIG. 1 closed with a fibrous texture positioned therein, and showing the formation of a filtration layer by injection of a first suspension filled with filtration particles having a particle size greater than the size of the interstices of the pore network of the fibrous texture, FIG. 3 is a schematic sectional view showing the tool of FIG. 1 closed with a fibrous texture and a filtration layer positioned therein, and showing the impregnation of the fibrous texture with a second suspension filled with particles having a particle size smaller than the size of the interstices of the pore network of the fibrous texture.

DESCRIPTION OF THE EMBODIMENTS

The fibrous texture has been produced in a known manner by two-dimensional weaving or by three-dimensional weaving.

Here, "two-dimensional weaving" means a conventional weaving method in which each weft thread passes from one side to the other of threads of a single warp layer or vice versa. The method of the invention is particularly suitable for allowing the introduction of a filled suspension into 2D fibrous textures, namely textures obtained by stacking 2D layers or folds, of substantial thickness, i.e., 2D fibrous structures having a thickness of at least 0.5 mm, preferably at least 1 mm.

"Three-dimensional weaving" or "3D weaving" or "multilayer weaving" means here a weaving method by which at least some of the weft threads connect warp threads on several layers of warp threads or vice versa according to a weave corresponding to a weave pattern which can especially be chosen from one of the following patterns: interlock, multi-plain, multi-satin and multi-twill.

"Interlock pattern or weave" means here a 3D weave pattern in which each layer of warp threads connects several layers of weft threads with all the threads of the same warp column having the same movement in the plane of the pattern.

"Multi-plain pattern or weave" here means a 3D weave with several layers of weft threads whose base pattern of each layer is equivalent to a conventional plain pattern but with certain points of the pattern that connect the layers of weft threads together.

"Multi-satin pattern or weave" here means a 3D weave with several layers of weft threads whose base pattern of each layer is equivalent to a conventional satin pattern but with certain points of the pattern that connect the layers of weft threads together.

"Multi-twill pattern or weave" here means a 3D weave with several layers of weft threads whose base pattern of each layer is equivalent to a conventional twill pattern but with certain points of the pattern that connect the layers of weft threads together.

3D textures have complex a geometry in which it is difficult to introduce and homogeneously spread solid particles in suspension. The method of the invention is also very well suited for the introduction of a filled suspension into 3D woven fibrous textures.

The fibrous texture may also have been produced from unidirectional (UD) layers or sheets.

The threads used to weave the fibrous texture intended to form the fibrous reinforcement of the composite material part can especially be formed of refractory ceramic fibres consisting of one of the following materials: alumina, mullite, silica, an aluminosilicate, a borosilicate, silicon carbide, carbon or a mixture of several of these materials.

According to a first example illustrated in FIGS. 1-3, a fibrous texture 10 is placed in a tool 100. In the example described here, the fibrous texture 10 is produced using one of the techniques defined above (UD or 2D layer stacking or 3D weaving) with Nextel 610™ alumina threads. The fibrous texture 10 is here intended to form the fibrous reinforcement of a part made of Oxide/Oxide type composite material.

Tool 100 includes a mould 110 and a counter-mould 120. The mould 110 comprises a bottom 111 provided with a plurality of ports 112. The mould 110 also includes a side wall 113 which forms with the bottom 111 a moulding cavity 114. In the example illustrated, the tool 100 in which the fibrous texture 10 is present is closed in its lower part by the mould 110 and is closed in its upper part by the counter-mould 120 forming a cover closing the tool 100. The mould 110 and the counter-mould 120 are used to size the preform and therefore the part to be obtained as well as to adjust the fibre content in the part to be obtained.

The mould 110 comprises a plurality of ports 112 opening into different areas of the moulding cavity 114, through which a first suspension filled with filtration particles having a particle size greater than the size of the interstices of the fibrous texture 10 is especially intended to be injected in order to form a filtration layer 130 between the bottom of the mould 111 and the second side 10b of the fibrous texture. However, it does not exceed the scope of the invention when the mould comprises a single port. In the case of several ports, the first suspension can be injected through only one part of the ports of the mould, to reserve the other part of the ports for the evacuation of a second suspension as detailed in the description that follows.

For its part, the counter-mould 120 comprises a plurality of ports 121 through which the solvent of the first suspension will be evacuated after passing through the fibrous texture 10. In addition, a second suspension filled with refractory ceramic particles is intended to be injected through the plurality of ports 121 of the counter-mould 120 in order to penetrate into the porosities of the fibrous texture 10 through the first side 10a of the fibrous texture 10. In the example illustrated in FIGS. 1-3, the solvent from the first suspension is evacuated through all the ports 121 of the counter-mould 120 and the second suspension is injected through all the ports 121 of the counter-mould 120. It does not exceed the scope of the invention when the counter-mould comprises a single port. In the case of several ports, the solvent from the first suspension can be evacuated through only one part of the ports of the counter-mould, to reserve the other part of the ports of the counter-mould for the injection of the second suspension.

The solvent from the second suspension is intended to be evacuated through the plurality of ports 112 of the mould 110. In the example illustrated in FIGS. 1-3, all of the ports 112 of the mould 110 were also previously used for the injection of the first suspension. In the case where the mould includes several ports, the solvent of the second suspension can be evacuated through only one part of the ports of the mould, the other part of the ports of the mould having been reserved for the injection of the first suspension.

In accordance with the invention, a filtration layer 130 is interposed between the fibrous texture 10 and the bottom of the mould 111. The filtration layer 130 is formed following the injection of the first suspension filled with filtration particles having a particle size greater than the size of the interstices of the fibrous texture 10, the liquid phase of said suspension being drained by the fibrous texture 10 then evacuated through the ports 121 of the counter-mould 120, the filtration particles thus remaining interposed between the fibrous texture 10 and the bottom of the mould 111. In the example described here, the filtration particles are ceramic or glass precursors. The liquid phase of the suspension can be water, for example.

The arrows 1000 represent the movement of the first suspension injected into the mould 110. The arrows 2000 represent the movement of the medium or liquid phase of the suspension drained by the fibrous texture 10 as illustrated in FIG. 2.

The preform can be held in compression in the mould and can completely fit the walls of the mould. Moreover, the preform constitutes a network permeable to the liquid phases of the first and second injections. Thus, there is no risk of deformation of the fibrous structure under the effect of the pressure of the first or second injection.

Moreover, pumping P1 can be carried out at the ports 121 of the counter-mould 120 during drainage, for example by means of a primary vacuum pump. Performing such pumping makes it possible to improve drainage and dry the filtration layer 130 more quickly.

For example, the filtration layer 130 has an average thickness comprised between 100 μm and 200 μm.

The filtration layer 130 allows drainage outside the fibrous texture 10 of the liquid phase of the second suspension, comprising a powder of refractory ceramic particles having a particle size smaller than the size of the interstices of the fibrous texture 10, and the evacuation of said liquid phase through the ports 112 of the mould 110 due to the application of a pressure gradient between the ports of the mould 112 and the ports of the counter-mould 121.

Before the injection of the second suspension filled with particles having the lowest particle size into the fibrous texture 10, a compaction pressure making it possible to compact the fibrous texture 10 between the mould 110 and the counter-mould 120 can be applied by tightening the mould 110 or by means of a press; this compaction pressure can be maintained during injection. The compaction pressure can also be exerted by a compaction liquid via a membrane as in the PolyFlex process.

As a variant, the compaction pressure can be applied after the injection of the second suspension begins and can then be maintained. Applying compaction pressure allows compacting the texture to help drain liquid through the filtration layer and achieve a target thickness for the fibrous preform without damaging it.

In the example described here, the second filled suspension corresponds to a liquid phase filled with refractory ceramic particles. FIG. 3 illustrates the configuration obtained during the injection of a second filled suspension and the drainage of the liquid medium from it. The suspension was injected under pressure through the ports 121 of the counter-mould 120 so as to penetrate the fibrous texture 10 through its first side 10a. The refractory ceramic particles present in the suspension are intended to allow the formation of a refractory ceramic matrix in the porosity of the fibrous texture 10. In one example of embodiment, this refractory ceramic matrix can be a refractory oxide matrix.

The second suspension can be a suspension of an alumina powder in water, for example. The average particle size (D50) of the alumina powder can be between 0.1 μm and 2 μm. The alumina powder used can be alpha alumina powder.

More generally, the second suspension can be a suspension comprising refractory ceramic particles having a particle size 5 to 15 times smaller on average than the average size of the interstices of the pore network of the fibrous texture.

Before injection, the volume content of particles in the suspension can be comprised between 5% and 50%. The refractory ceramic particles can comprise a material chosen from: alumina, mullite, silica, an aluminosilicate, an aluminophosphate, zirconia, a carbide, a boride, a silicide and a nitride or a precursor of one or more of these materials. Depending on their basic composition, the refractory ceramic particles can also be mixed with particles of alumina, zirconia, aluminosilicate, a rare earth oxide, a rare earth silicate (which can, for example, be used in environmental or thermal barriers) or any other filler making it possible to functionalize the composite material part to be obtained such as carbon black, graphite or silicon carbide.

The liquid phase of the second suspension can comprise, for example, an aqueous phase having an acidic pH (i.e., a pH less than 7) and/or an alcoholic phase comprising ethanol, for example. The suspension may include an acidifier such as nitric acid and the pH of the liquid medium may be comprised between 1 and 5, for example. Moreover, the suspension may comprise an organic binder such as polyvinyl alcohol (PVA) which is especially soluble in water.

As illustrated in FIG. 3, the refractory ceramic particles are present after injection of the second suspension into the porosity of the fibrous texture 10. The arrows 3000 represent the movement of the suspension injected into the fibrous texture 10. The arrows 4000 represent the movement of the medium or liquid phase of the suspension drained by the filtration layer 130 as illustrated in FIG. 3.

The counter-mould 120 exerts pressure on the fibrous texture 10 during and after the step of injecting the second suspension.

In addition, pumping P2 can be carried out at the ports 112 of the mould 110 during drainage, for example by means of a primary vacuum pump. Performing such pumping makes it possible to improve drainage and dry the fibrous texture 10 more quickly.

In this configuration, the filtration layer 130 makes it possible to retain in the fibrous texture 10 the particles initially present in the second suspension and for all or part of these particles to be deposited by filtration in the fibrous texture 10.

In the example presented here, the mould does not include a membrane. Naturally, it does not exceed the scope of the invention if the injections of the first and/or second suspensions are carried out under a membrane in a well-known manner to improve the impregnation of the fibrous texture.

Once the injection and drainage steps have been carried out, a fibrous preform is obtained comprising the fibrous texture 10 filled with refractory ceramic particles and the filtration layer 130 which is linked to the fibrous texture 10.

Adhesion between the filtration layer 130 and the fibrous texture 10 is achieved during the injection of refractory ceramic particles. Material is deposited between the filtration layer 130 and the fibrous texture 10 and the whole is held together by means of compaction. The sintering heat treatment then creates bridges between the particles which completes adhesion.

The preform obtained is then dried and then demoulded, the preform being able to retain, after demoulding, the shape adopted after compaction between the mould 110 and the counter-mould 120 thanks to the presence of a binder in the suspension of refractory ceramic particles such as PVA.

The preform is then subjected to a heat treatment, sintering here, for example in air at a temperature between 1000° C. and 1200° C. in order to pre-sinter the refractory ceramic particles and thus form a refractory ceramic matrix in the porosity of fibrous texture 10. A part made of Oxide/Oxide composite material is then obtained, provided on the one hand with a fibrous reinforcement having a high matrix volume ratio with a homogeneous distribution of the refractory ceramic matrix throughout the fibrous reinforcement, and provided on the other hand with a surface covered with a smooth layer of ceramic or glass with excellent surface condition, resulting from the filtration layer 130.

A part made of CMC composite material other than Oxide/Oxide can be obtained in the same way by producing the fibrous texture and the filtration layer with silicon carbide and/or carbon fibres and by using a second suspension filled with particles of carbide (for example SiC), boride (for example TiB2), silicide (for example MoSi2) or nitride (for example Si3N4).

As a variant, the second filled suspension injected into the fibrous texture may comprise particles of a refractory ceramic precursor, for example of the sol-gel or polymeric type. In this case, the heat treatment comprises at least one step of transforming the refractory ceramic precursor into a ceramic material (called ceramization step) possibly followed by an additional sintering step in order to further densify the composite material part.

The invention claimed is:

1. A method for injecting ceramic particles into a fibrous texture comprising:
    placing a fibrous texture in a mold, the fibrous texture being interposed between one or more first ports and one or more second ports,
    injecting through the one or more first ports a first suspension comprising a powder of filtration particles having a particle size greater than a size of interstices of a pore network of the fibrous texture;
    injecting through the one or more first ports a first suspension comprising a powder of filtration particles having a particle size greater than a size of interstices of a pore network of the fibrous texture;
    draining a liquid phase of the first suspension by the fibrous texture, evacuating said liquid phase through the one or more second ports and retaining the filtration particles by the fibrous texture so as to form a filtration layer between said fibrous texture and the one or more first ports,
    injecting a second suspension into the fibrous texture through the one or more second ports, the second suspension comprising a powder of refractory ceramic particles with a particle size smaller than the size of the interstices of the pore network of the fibrous texture,
    and draining through the filtration layer a liquid phase of the second suspension having passed through the fibrous texture and retaining refractory ceramic particle powder inside said fibrous texture by the filtration layer so as to obtain a fibrous preform comprising at least the fibrous texture filled with refractory ceramic particles and the filtration layer, the liquid phase of the second suspension being evacuated through the first ports.

2. The method according to claim 1, wherein the powder of the first suspension is a ceramic or glass precursor.

3. The method according to claim 1, wherein the filtration layer has an average thickness comprised between 100 µm and 200 µm.

4. The method according to claim 1, wherein the size of the particles of the second suspension is on average, 5 to 15 times smaller than an average size of the interstices of the pore network of the fibrous texture.

5. The method according to claim 1, wherein the particles of the second suspension are made of a material chosen from: alumina, mullite, silica, an aluminosilicate, an aluminophosphate, zirconia, a carbide, a boride, a silicide and a nitride or a mixture of several of these materials.

6. The method according to claim 1, wherein the fibrous texture comprises a fibrous structure obtained by two-dimensional weaving, or three-dimensional or multilayer weaving, or automatic placement of unidirectional fibers.

7. The method according to claim 1, wherein threads of the fibrous texture are formed of fibers consisting of one or more of the following materials: alumina, mullite, silica, an aluminosilicate, a borosilicate, carbide silicon and carbon.

8. The method according to claim 1, wherein the mold has an annular or frustoconical geometry of revolution, the fibrous texture being shaped according to an annular or frustoconical geometry of revolution when placed in the mold.

9. A method of manufacturing a composite material comprising performing the injection method according to claim 1, and performing a heat treatment of the refractory ceramic particles present in the fibrous texture of the preform in order to form a composite material part comprising at least said fibrous texture densified by a refractory ceramic matrix and the filtration layer.

* * * * *